(12) United States Patent
Nakagawa

(10) Patent No.: US 7,783,483 B2
(45) Date of Patent: Aug. 24, 2010

(54) SPEECH PROCESSING APPARATUS AND CONTROL METHOD THAT SUSPEND SPEECH RECOGNITION

(75) Inventor: Kenichiro Nakagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 640 days.

(21) Appl. No.: 11/779,575

(22) Filed: Jul. 18, 2007

(65) Prior Publication Data

US 2008/0021705 A1 Jan. 24, 2008

(30) Foreign Application Priority Data

Jul. 20, 2006 (JP) .............................. 2006-198710

(51) Int. Cl.
G10L 15/00 (2006.01)
G10L 15/28 (2006.01)
H04R 29/00 (2006.01)

(52) U.S. Cl. ........................... 704/231; 704/270; 381/58

(58) Field of Classification Search ................. 704/231, 704/233, 258, 260, 270; 381/59, 107, 110, 381/58
See application file for complete search history.

(56) References Cited

U.S. PATENT DOCUMENTS

| | | | |
|---|---|---|---|
| 5,822,718 A * | 10/1998 | Bakis et al. ................. 702/180 |
| 6,393,396 B1 | 5/2002 | Nakagawa et al. .......... 704/233 |
| 6,999,591 B2 * | 2/2006 | Fado et al. ..................... 381/58 |
| 7,032,115 B2 * | 4/2006 | Kashani ....................... 713/300 |
| 7,039,193 B2 * | 5/2006 | Mantegna et al. ............. 381/58 |
| 7,243,068 B2 * | 7/2007 | Barker et al. ................. 704/233 |
| 7,299,182 B2 * | 11/2007 | Xie ............................. 704/258 |
| 7,333,798 B2 * | 2/2008 | Hodge ......................... 455/411 |
| 7,355,591 B2 * | 4/2008 | Sugimoto .................... 345/169 |
| 7,543,082 B2 * | 6/2009 | Nakagawa ..................... 710/8 |
| 2002/0077818 A1 * | 6/2002 | Shieh .......................... 704/258 |
| 2003/0236673 A1 | 12/2003 | Nakagawa et al. ........... 704/277 |
| 2004/0002867 A1 | 1/2004 | Nakagawa et al. ........... 704/275 |
| 2004/0120531 A1 * | 6/2004 | Solderits ....................... 381/58 |
| 2004/0122677 A1 * | 6/2004 | Lee et al. ..................... 704/277 |
| 2005/0102438 A1 * | 5/2005 | Nakagawa ..................... 710/1 |
| 2005/0120046 A1 * | 6/2005 | Nakagawa et al. ........... 707/102 |
| 2005/0157885 A1 * | 7/2005 | Olney et al. ................... 381/58 |
| 2005/0216261 A1 | 9/2005 | Garner et al. ................ 704/215 |
| 2008/0040108 A1 * | 2/2008 | Nakagawa et al. ........... 704/231 |
| 2010/0145703 A1 * | 6/2010 | Park ............................ 704/260 |

FOREIGN PATENT DOCUMENTS

JP 62-150295 7/1987

* cited by examiner

*Primary Examiner*—Martin Lerner
(74) *Attorney, Agent, or Firm*—Fitzpatrick, Cella, Harper & Scinto

(57) ABSTRACT

A speech processing apparatus includes a speech input device which inputs speech, a connection unit which detachably connects the speech input device, a speech recognizer which recognizes speech input by the speech input device through the connection unit, and a monitor which monitors the connection state of the speech input device at the connection unit, and when the connection state changes, outputs an event for notifying the change. The speech recognizer suspends speech recognition processing upon receiving the event from the monitor.

3 Claims, 7 Drawing Sheets

| EVENT NAME | SPEECH RECOGNITION PARAMETER TO BE CHANGED |
|---|---|
| DISCONNECTION OF EXTERNAL MICROPHONE | SPEECH INPUT VOLUME IS SET TO A |
| CONNECTION OF EXTERNAL MICROPHONE | SPEECH INPUT VOLUME IS SET TO B |

FIG. 5

| EVENT NAME | SPEECH RECOGNITION PARAMETER TO BE CHANGED |
|---|---|
| DISCONNECTION OF EXTERNAL MICROPHONE | SPEECH INPUT VOLUME IS SET TO A |
| CONNECTION OF EXTERNAL MICROPHONE | SPEECH INPUT VOLUME IS SET TO B |

SPEECH PROCESSING APPARATUS AND CONTROL METHOD THAT SUSPEND SPEECH RECOGNITION

BACKGROUND OF THE INVENTION

1. Field of the Invention

The present invention relates to a speech processing apparatus which performs speech recognition or speech synthesis and a control method for the apparatus.

2. Description of the Related Art

Recently, a speech recognition technique of controlling a device with speech has been put into practice. The speech recognition technique has a great advantage of allowing users such as children, elderly people, and physically handicapped people to control devices by speech utterance. Such a speech recognition technique has been particularly commercialized in the fields of car navigation systems, telephone services, welfare equipment, and the like.

In general, when a device is to be controlled by speech recognition, speech from the user is captured through a microphone as a speech input device built in the device. Some users, however, may use their own microphones. When using speech recognition in operator work such as telephone operation, the operator often uses his/her own headset microphone in consideration of hygiene. In addition, a physically handicapped user uses a microphone conforming to his/her own physical handicap.

When a user uses speech recognition through his/her own microphone, the device compatible with speech recognition needs to have a terminal into which the user's microphone can be plugged. Some apparatuses compatible with speech recognition have such microphone terminals.

Assume that an apparatus compatible with speech recognition has a terminal which allows connection of a user's microphone. In this case, the user can connect the microphone to the terminal during speech recognition. Electrical noise tends to occur at the time of connection of the microphone. Such noise is captured as speech noise by a speech recognition apparatus. If the apparatus erroneously recognizes such speech noise as some utterance from the user, the device may execute a command which the user does not desire.

Japanese Patent Laid-Open No. 62-150295 discloses a technique of suspending speech recognition when the intensity of noise input from a microphone is equal to or more than a predetermined level.

However, the characteristic of electrical noise caused at the time of insertion/removal of the microphone often affects speech recognition more than the intensity of the noise. It is therefore inappropriate to suspend speech recognition processing based only on the intensity of the noise as a decision criterion.

In addition, a microphone built in a device and a microphone which the user connects may differ in the optimal values of internal parameters used for speech recognition. For example, the optimal value of a speech input volume in the microphone built into the device might degrade the recognition performance based on the microphone which the user connects.

There has been no prior art giving consideration to the connection/disconnection of a microphone at the time of speech recognition.

SUMMARY OF THE INVENTION

In one aspect of the present invention, a speech processing apparatus includes a speech input device which inputs speech, a connection unit which detachably connects the speech input device, a speech recognizer which recognizes speech input by the speech input device through the connection unit, and a monitor which monitors the connection state of the speech input device at the connection unit, and when the connection state changes, outputs an event for notifying the change. The speech recognizer suspends speech recognition processing upon receiving the event from the monitor.

Further features of the present invention will become apparent from the following description of exemplary embodiments with reference to the attached drawings.

BRIEF DESCRIPTION OF THE DRAWINGS

FIG. 5 is a view showing an example of a table showing the relationship between connection/disconnection events and the changed contents of speech recognition parameters in the second embodiment;

DESCRIPTION OF THE EMBODIMENTS

Various exemplary embodiments, features, and aspects of the present invention will be described in detail below with reference to the drawings.

First Embodiment

Figure 1:
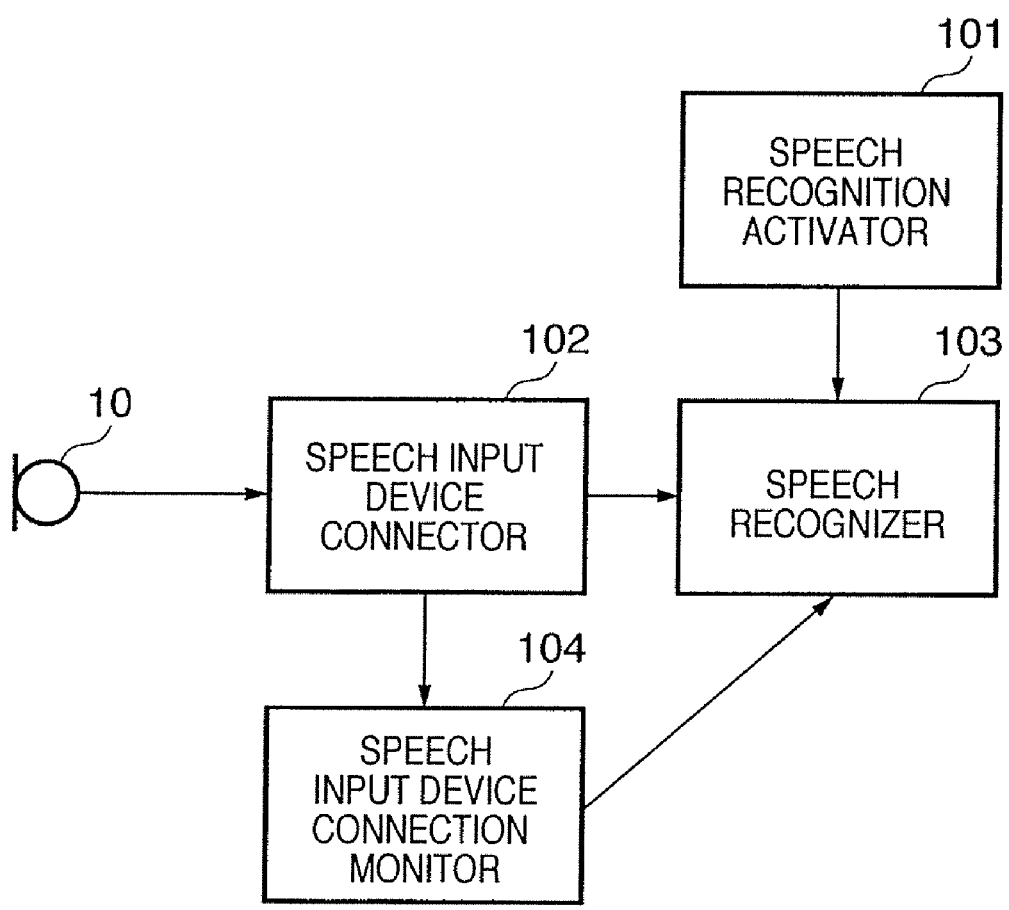
FIG. 1 is a block diagram showing functional arrangement of a speech recognition apparatus according to the first embodiment.

FIG. 1 is a block diagram showing the functional arrangement of a speech recognition apparatus according to the first embodiment.

The speech recognition apparatus according to this embodiment is built in a speech recognition enabled device and converts acquired speech into a control command for the device. This speech recognition apparatus includes a speech recognition activator 101. The speech recognition activator 101 monitors a speech recognition activation event from outside the apparatus, and transmits a start command for speech recognition processing to a speech recognizer 103 in response to the event. It suffices to generate a speech recognition activation event only when the user presses a specific push button.

Upon receiving the speech recognition start command from the speech recognition activator 101, the speech recognizer 103 starts speech recognition processing. More specifically, the speech recognizer 103 acquires speech data from a speech input device 10 such as a microphone connecting to a speech input device connector 102 through it. The speech recognizer 103 then performs speech recognition processing for the acquired speech data and converts it into a control command for the speech recognition enabled device incorporating this speech recognition apparatus. Note that since a known technique can be used for speech recognition processing in this case, a detailed description will be omitted.

The speech input device connector 102 detachably connects the speech input device 10. More specifically, the speech input device connector 102 comprises a microphone terminal and allows the user to connect and disconnect a microphone as the speech input device 10 to and from the terminal. A speech input device connection monitor 104 connects to the speech input device connector 102. When the user connects or disconnects the speech input device 10 such as a microphone, the speech input device connection monitor 104 transmits an event. In this case, this event is defined as a "connection/disconnection event". It suffices to detect the connection/disconnection of the speech input device 10 by, for example, providing the speech input device connector 102 with a contact point which is rendered conductive when the speech input device 10 connects to the connector and is rendered nonconductive when the speech input device 10 disconnects from the connector, and checking the conduction state of the contact point. Upon receiving this connection/disconnection event, the speech recognizer 103 suspends speech recognition processing.

Figure 3:
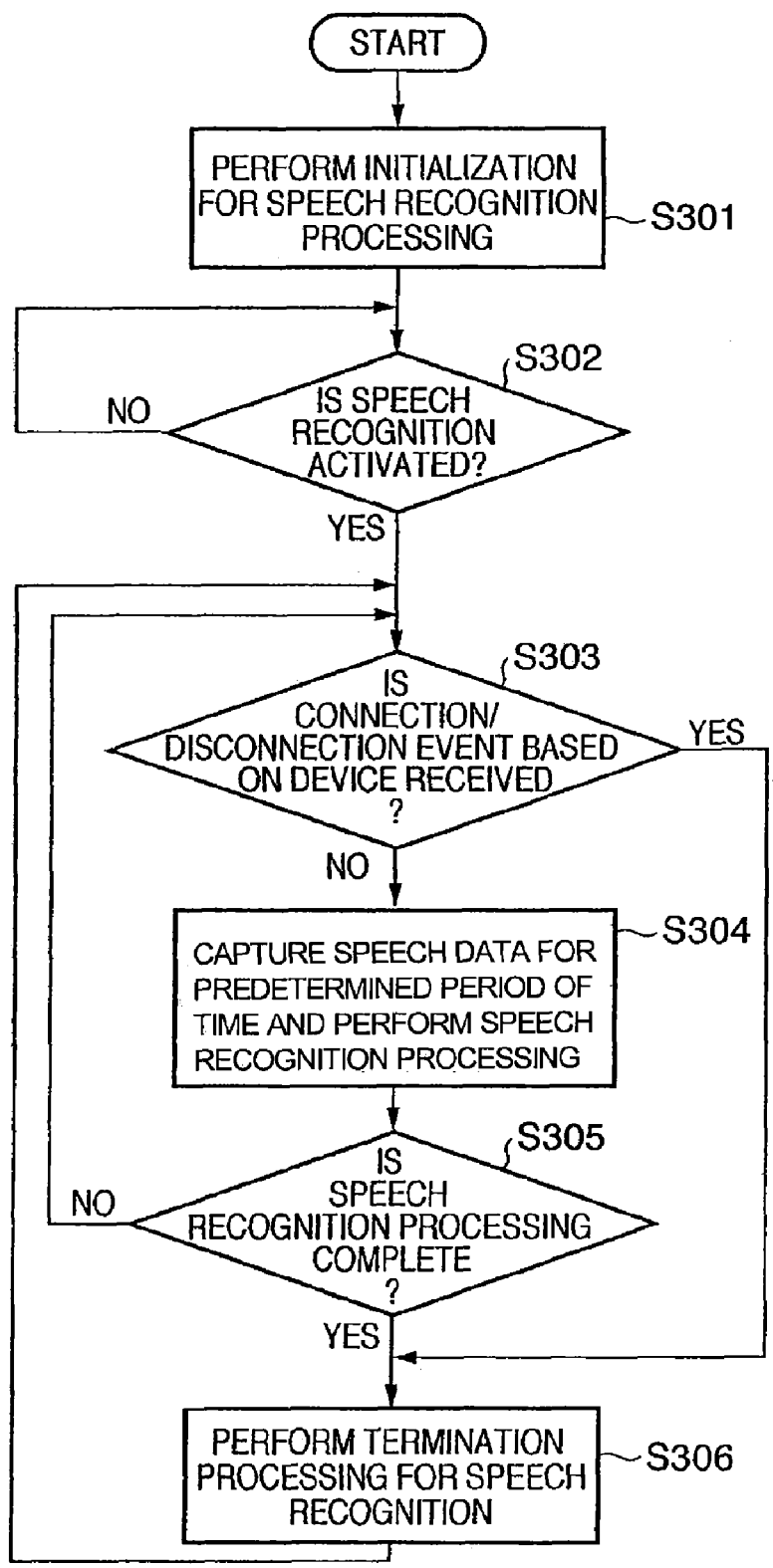
FIG. 3 is a flowchart showing the operation of the speech recognition apparatus according to the first embodiment.

FIG. 3 is a flowchart showing the operation of the speech recognition apparatus according to this embodiment.

When the user powers on the speech recognition enabled device incorporating this speech recognition apparatus, the speech recognition apparatus begins the process embodied by this flowchart. First, the apparatus performs initialization for speech recognition processing (step S301). In this case, the apparatus performs operation for preparing for speech recognition, as for example, initializing various kinds of parameters used for speech recognition and loading internal data.

The apparatus then checks an activation event for speech recognition (step S302). Upon receiving this activation event, the apparatus checks a connection/disconnection event which is generated upon connection/disconnection of a speech input device (step S303). If the apparatus has not received this connection/disconnection event, the apparatus acquires speech data of a predetermined time length (e.g., 10 ms) from the speech input device 10 such as a microphone. The apparatus performs speech recognition processing for the captured speech data (step S304). The apparatus then determines whether the speech recognition processing is complete (step S305). If the speech recognition is not complete, the process returns to step S303 to repeat the processing. If the speech recognition is complete, the apparatus performs termination processing for speech recognition (step S306). More specifically, the speech recognition apparatus transmits the speech recognition result as a control command to the speech recognition enabled device incorporating the apparatus.

Upon receiving the connection/disconnection event based on the speech input device 10 in step S303, the apparatus performs termination processing for speech recognition (step S306), and immediately suspends speech recognition. In this case, the apparatus may notify, through a GUI or the like, the user of information indicating that the apparatus has suspended speech recognition upon disconnection (connection) of the speech input device 10. Alternatively, it suffices to notify the user only of information indicating that speech recognition has failed and that no recognition result has been obtained.

Electrical noise may occur before the generation of a connection/disconnection event upon connection/disconnection of the microphone depending on how the speech input device connection monitor 104 is mounted. In general, however, when speech recognition processing is performed, the corresponding algorithm outputs a recognition result with a certain delay (e.g., about 0.5 sec) from the input of speech. For this reason, if the delay of a connection/disconnection event is smaller than that of speech recognition, it is possible to suspend speech recognition before a recognition result unintended by the user is output due to electrical noise.

With the above processing, upon receiving a connection/disconnection event based on the speech input device 10 during speech recognition, the apparatus can suspend speech recognition processing during its execution. This makes it possible to prevent an operation error in the speech recognition apparatus due to electrical noise produced at the time of connection/disconnection of a microphone or the like.

Second Embodiment

Figure 2:
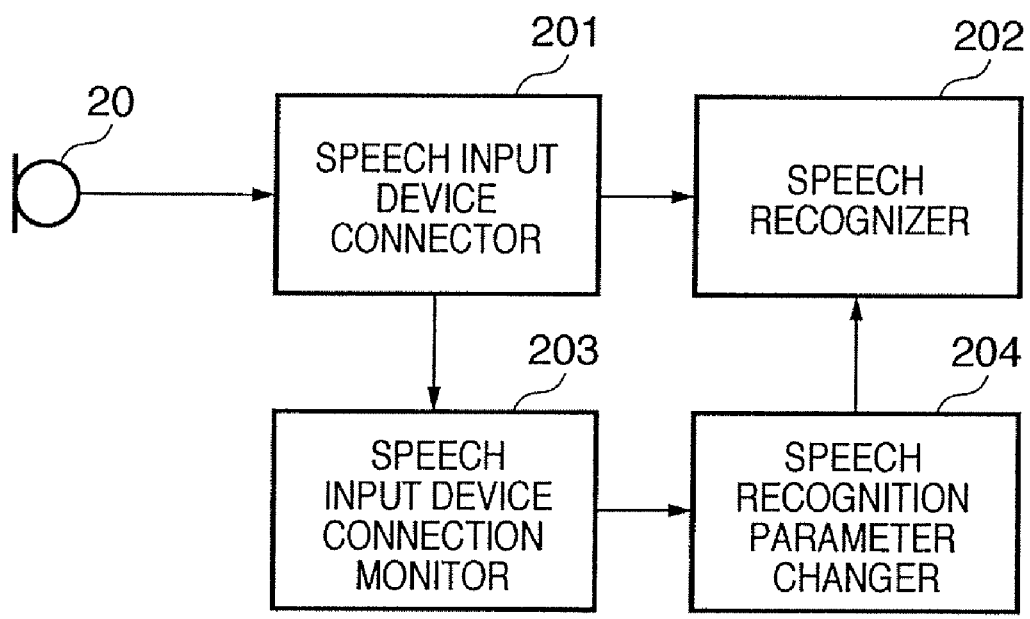
FIG. 2 is a block diagram showing the functional arrangement of a speech recognition apparatus according to the second embodiment.

FIG. 2 is a block diagram showing the functional arrangement of a speech recognition apparatus according to the second embodiment.

Referring to FIG. 2, a speech recognizer 202 which executes speech recognition performs speech recognition of an utterance from the user, and transmits a speech recognition result as a control command to a speech recognition enabled device incorporating this speech recognition apparatus.

This speech recognition apparatus includes a speech input device connector 201 such as a microphone terminal. A speech input device connection monitor 203 connects to the speech input device connector 201. The speech input device connection monitor 203 monitors the speech input device connector 201 such as a microphone terminal. When a speech input device 20 such as a microphone connects to (disconnects from) the speech input device connector 201, the speech input device connection monitor 203 notifies a speech recognition parameter changer 204 of the corresponding information (connection/disconnection event).

Upon receiving the connection/disconnection event based on the speech input device 20, the speech recognition parameter changer 204 changes operation parameters for speech recognition which are used in the speech recognizer 202. The operation parameters for speech recognition are internal variables used in speech recognition processing. For example, a speech input volume is one of the operation parameters. The speech input volume is an internal variable for determining the amount of amplification of the amplitude of a speech signal input from a microphone. The smaller this internal variable, the smaller the amplitude of a speech signal from the microphone, and vice versa.

Figure 4:
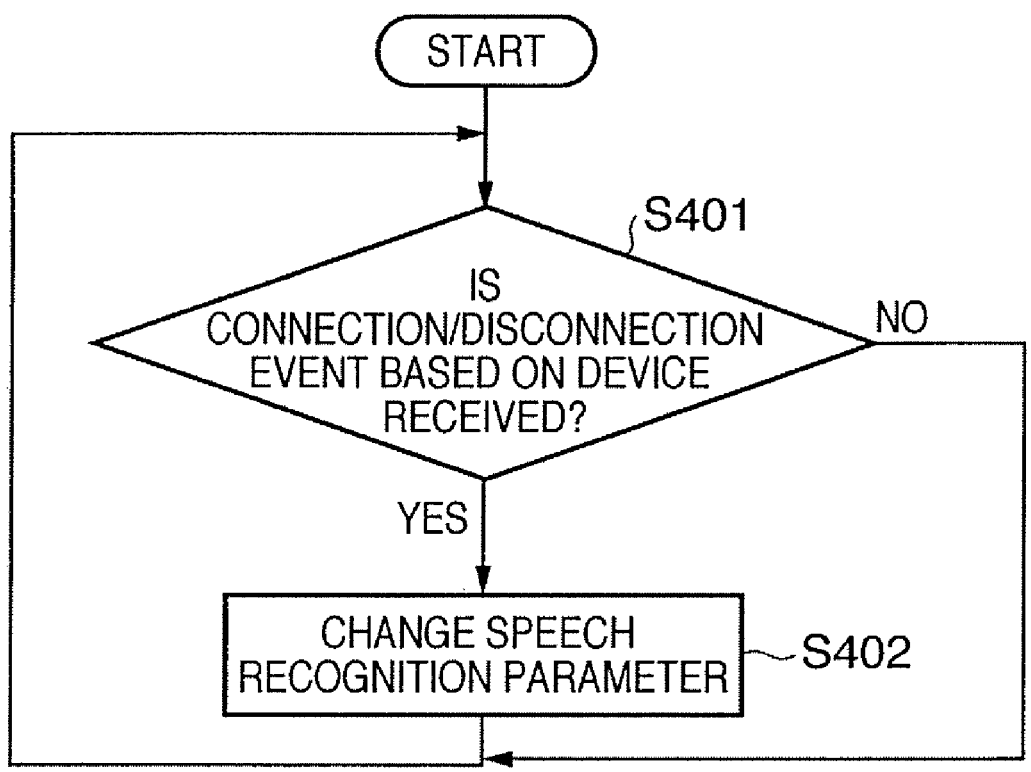
FIG. 4 is a flowchart showing the operation of the speech recognition apparatus according to the second embodiment.

FIG. 4 is a flowchart showing the operation of the speech recognition apparatus according to this embodiment.

When the user powers on the device incorporating this speech recognition apparatus, the speech recognition apparatus begins the process embodied by this flowchart. First, the apparatus checks a connection/disconnection event based on the speech input device 20 (step S401). Upon receiving this event, the apparatus sets a speech recognition parameter corresponding to the event in the speech recognizer 202 (step S402). If the apparatus does not receive this connection/disconnection event, the apparatus does not change the speech recognition parameter, and repeatedly checks for a connection/disconnection event.

It suffices to manage the relationship between the specific contents of connection/disconnection events and the changed contents of speech recognition parameters by using a table like that shown in FIG. 5. If, for example, the contents of a received connection/disconnection event indicate that the user has disconnected the external microphone, the apparatus sets the speech input volume to A. If the contents of the received connection/disconnection event indicate that the user connects the external microphone, the apparatus sets the speech input volume to B. This makes it possible to automatically change the speech input volume depending on the user's microphone or the microphone as an accessory.

In addition, the apparatus may change the speech recognition grammar to be used for speech recognition in accordance with a connection/disconnection event. This makes it possible to change the vocabulary that can be uttered in accordance with the connection state of the user's microphone. It is also possible to change the acoustic model or the Cepstrum Mean information used in the CMS (Cepstrum Mean Subtraction) method as a known technique in accordance with a connection/disconnection event. This makes it possible to prevent deterioration in speech recognition performance due to a change of the microphone to be used.

Third Embodiment

The first and second embodiments described above can be combined. More specifically, when receiving a connection/disconnection event based on a speech input device during speech recognition, a speech recognition apparatus suspends the speech recognition first, and then changes the speech recognition parameter to be used. This makes it possible to prevent an operation error in the speech recognition apparatus at the time of connection/disconnection of a microphone, and also to automatically set optimal speech recognition parameters.

In addition, it suffices to resume speech recognition processing after the above operation. That is, when receiving a connection/disconnection event based on the speech input device during speech recognition, the apparatus suspends speech recognition first, and then changes the speech recognition parameter to be used. Thereafter, the apparatus resumes speech recognition. With this operation, even if the user connects/disconnects the microphone, the speech recognition apparatus can continue the operation as if nothing happened from the viewpoint of the user. If the apparatus does not resume the operation while suspending speech recognition, the user cannot understand what has happened, and may be confused. However, this embodiment can prevent this.

Fourth Embodiment

The first to third embodiments have exemplified the relationship between the speech input devices and speech recognition. However, the technical idea of the present invention can also be applied to the relationship between speech output devices and speech synthesis. When the user connects/disconnects a speaker during the output of synthesized speech, electrical noise produced at this time sometimes gets mixed in the synthesized speech, and the speaker produces an uncomfortable sound. This embodiment reduces such an uncomfortable sound.

Figure 6:
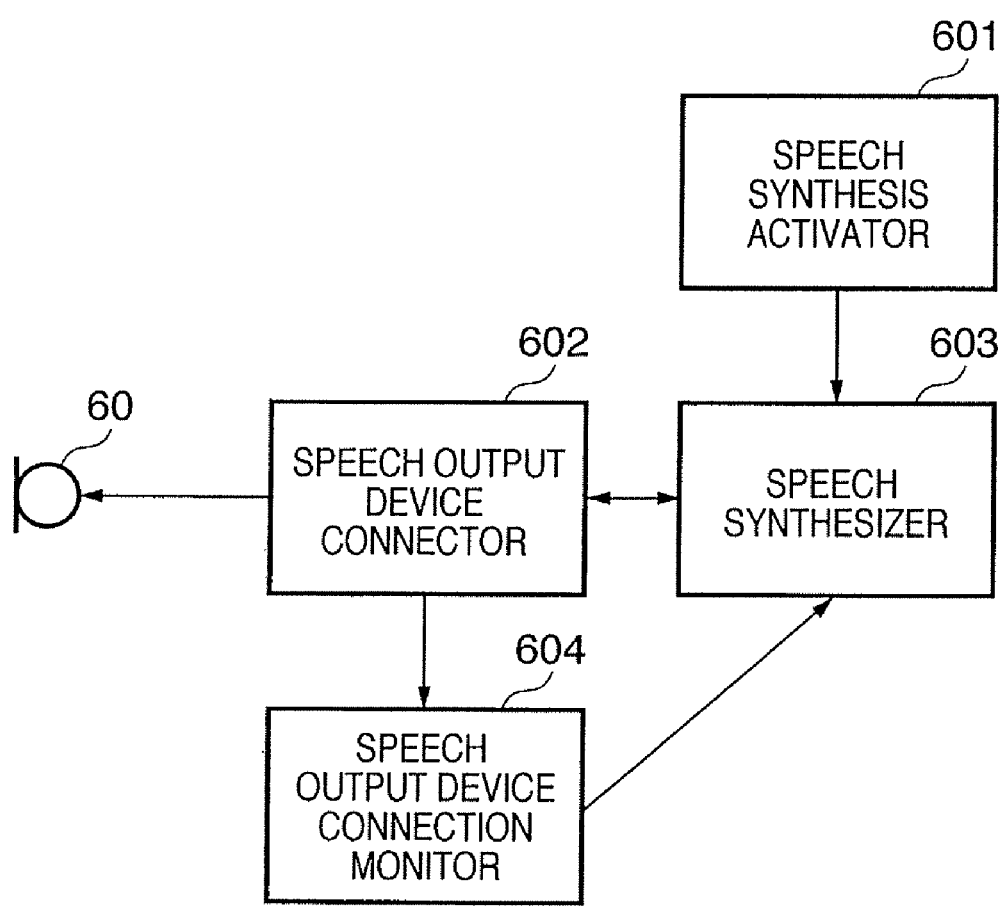
FIG. 6 is a block diagram showing the functional arrangement of a speech synthesis apparatus according to the fourth embodiment.

FIG. 6 is a block diagram showing the functional arrangement of a speech synthesis apparatus according to this embodiment.

The speech synthesis apparatus according to this embodiment includes a speech synthesis activator 601. The speech synthesis activator 601 monitors a speech synthesis start event from outside the apparatus, and transmits a start command for speech synthesis processing to a speech synthesizer 603 in response to this event. It suffices to generate a speech synthesis start event when, for example, the user presses a specific push button.

When receiving a speech synthesis start command from the speech synthesis activator 601, the speech synthesizer 603 starts speech synthesis processing. More specifically, the speech synthesizer 603 generates synthesized speech and outputs it from a speech output device 60 such as a speaker connecting to the speech synthesizer 603 through a speech output device connector 602 such as a speaker terminal or the like. Note that since a known technique can be used for speech synthesis processing in this case, a detailed description will be omitted.

The speech output device connector 602 detachably connects the speech output device 60. More specifically, the speech output device connector 602 comprises a speaker terminal and allows the user to connect and disconnect a speaker as the speech output device 60 to and from the terminal. A speech output device connection monitor 604 connects to the speech output device connector 602. The speech output device connection monitor 604 monitors the speech output device connector 602 such as a speaker terminal. When the user connects (or disconnects) a speech output device such as a speaker, the speech output device connection monitor 604 transmits a connection/disconnection event. Upon receiving this event during speech synthesis, the speech synthesizer 603 suspends the speech synthesis.

Figure 7:
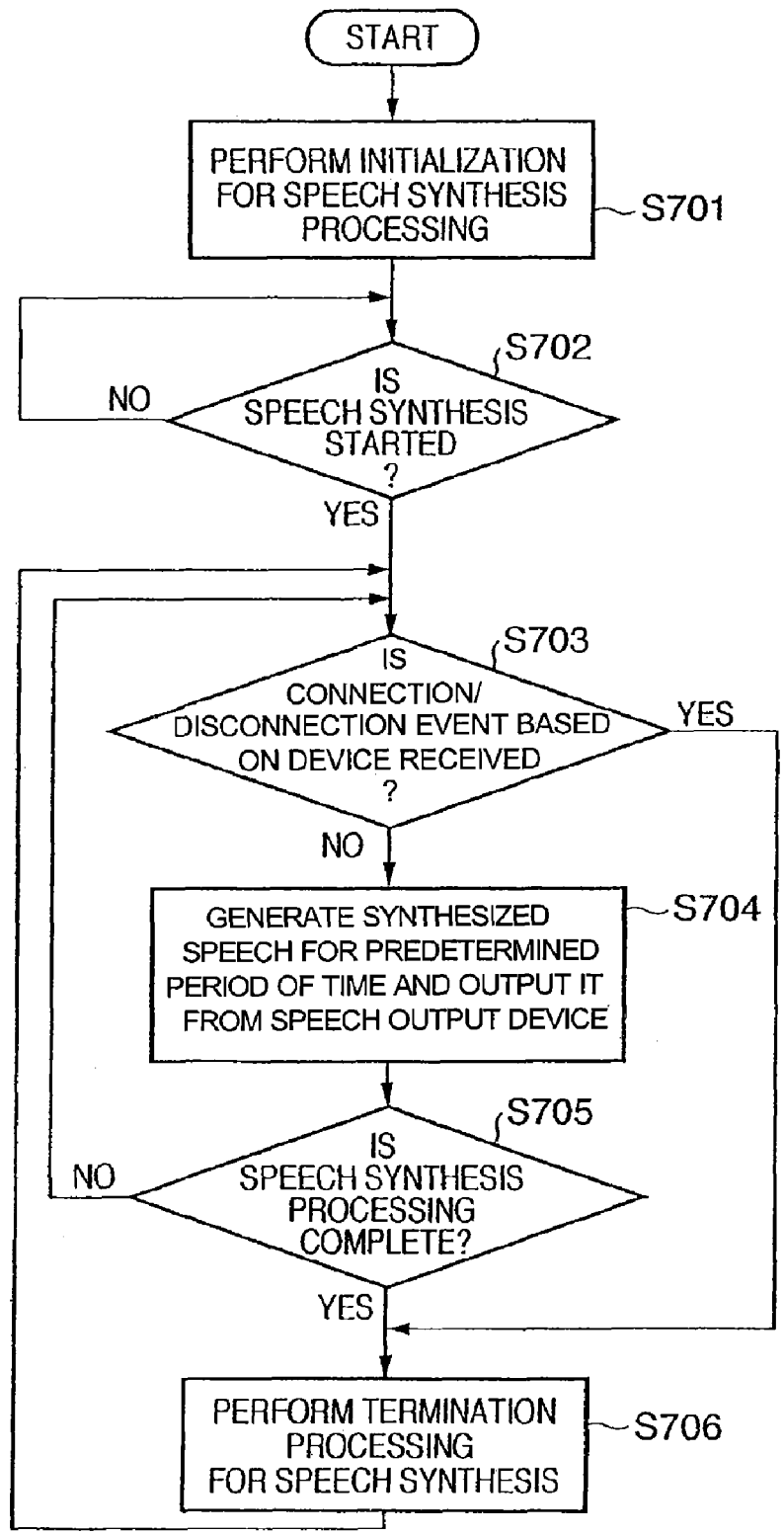
FIG. 7 is a flowchart showing the operation of the speech synthesis apparatus according to the fourth embodiment.

FIG. 7 is a flowchart showing the operation of the speech synthesis apparatus according to this embodiment.

When the user powers on a device incorporating this speech synthesis apparatus, the speech synthesis apparatus begins the process embodied by this flowchart. First, the apparatus performs initialization for speech synthesis processing (step S701). In this case, the apparatus performs operation for preparing for speech synthesis, as for example, initializing various kinds of parameters used for speech synthesis and loading internal data.

The apparatus then checks a start event for speech synthesis (step S702). Upon receiving this start event, the apparatus checks for a connection/disconnection event which is generated upon connection/disconnection of a speech output device (step. S703). If the apparatus has not received this connection/disconnection event, the apparatus generates synthesized speech of a predetermined period of time by speech synthesis processing, and outputs the speech data from the speech output device 60 such as a speaker (step S704). The apparatus then determines whether the speech synthesis processing is complete (step S705). If speech synthesis is not complete, the process returns to step S703 to repeat the processing. If speech synthesis is complete, the apparatus performs termination processing of speech synthesis (step S706).

Upon receiving a connection/disconnection event based on the speech output device 60 in step S703, the apparatus performs termination processing for speech synthesis (step S706), and immediately suspends speech synthesis. In this case, the apparatus may notify, through a GUI or the like, the user of information indicating that the apparatus has suspended speech synthesis upon disconnection (connection) of the speech output device 60.

According to the fourth embodiment described above, upon detecting connection/disconnection of a speaker or the like during speech synthesis, the apparatus can immediately suspend speech synthesis processing during its execution. This makes it possible to reduce an uncomfortable speech output due to electrical noise generated at the time of connection/disconnection of a speaker or the like.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-198710, filed Jul. 20, 2006, which is hereby incorporated by reference herein in its entirety.

What is claimed is:

1. A speech processing apparatus comprising:
    a connection unit configured to detachably connect to a speech input device;
    a speech recognition unit configured to recognize speech; and
    a monitoring unit configured to monitor a connection state of the speech input device at said connection unit, and when the connection state changes, output an event for notifying of the change,
    wherein said speech recognition unit suspends speech recognition processing, changes an operation parameter used for the speech recognition processing, and resumes the speech recognition processing after the change of the operation parameter, upon receiving the event from said monitoring unit.

2. A control method for a speech recognition apparatus which includes a connection unit configured to detachably connect to a speech input device and a speech recognition unit configured to recognize speech, the method comprising the steps of:
    monitoring a connection state of the speech input device at the connection unit, and when the connection state changes, notifying of the change; and
    suspending speech recognition processing by the speech recognition unit, changing an operation parameter used for the speech recognition processing, and resuming the speech recognition processing after the change of the operation parameter, upon receiving notification of the change in said monitoring step.

3. A program stored on a computer-readable medium for causing a computer to execute a control method for a speech processing apparatus defined in claim 2.

* * * * *